(12) United States Patent
Van Brocklin et al.

(10) Patent No.: US 7,514,661 B2
(45) Date of Patent: Apr. 7, 2009

(54) FOCUS CALIBRATION IN AN OPTICAL DRIVE

(75) Inventors: Andrew L Van Brocklin, Corvallis, OR (US); D. Mitchel Hanks, Ft. Collins, CO (US); Greg J. Lipinski, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 829 days.

(21) Appl. No.: 11/028,739

(22) Filed: Jan. 4, 2005

(65) Prior Publication Data

US 2006/0146664 A1 Jul. 6, 2006

(51) Int. Cl.
*G02B 7/04* (2006.01)
*G11B 7/00* (2006.01)

(52) U.S. Cl. .............. 250/201.5; 369/44.35
(58) Field of Classification Search .......... 250/201.5; 369/44.32–44.36
See application file for complete search history.

(56) References Cited

U.S. PATENT DOCUMENTS

| 5,499,231 | A | 3/1996 | Fennema et al. |
|---|---|---|---|
| 5,541,900 | A | 7/1996 | Ito et al. |
| 5,831,952 | A | 11/1998 | Yamada et al. |
| 6,744,705 | B1 | 6/2004 | Sumida et al. |
| 2002/0089912 | A1* | 7/2002 | Kobayashi ............... 369/53.23 |
| 2002/0131346 | A1 | 9/2002 | Turner et al. |

FOREIGN PATENT DOCUMENTS

EP 1308938 5/2003
JP 2003233912 A * 8/2003

OTHER PUBLICATIONS

International Search Report dated May 30, 2006 (1 page).

* cited by examiner

*Primary Examiner*—Thanh X Luu

(57) ABSTRACT

Focus calibration in an optical drive. Optics are moved with respect to a disc in the optical drive. A first interface of the disc is optically detected at a first distance, and a first drive signal value is detected at the first interface. A drive signal change is determined using a second drive signal value at a second distance. A gain is determined using the drive signal change and a thickness associated with the first and second distances.

56 Claims, 7 Drawing Sheets

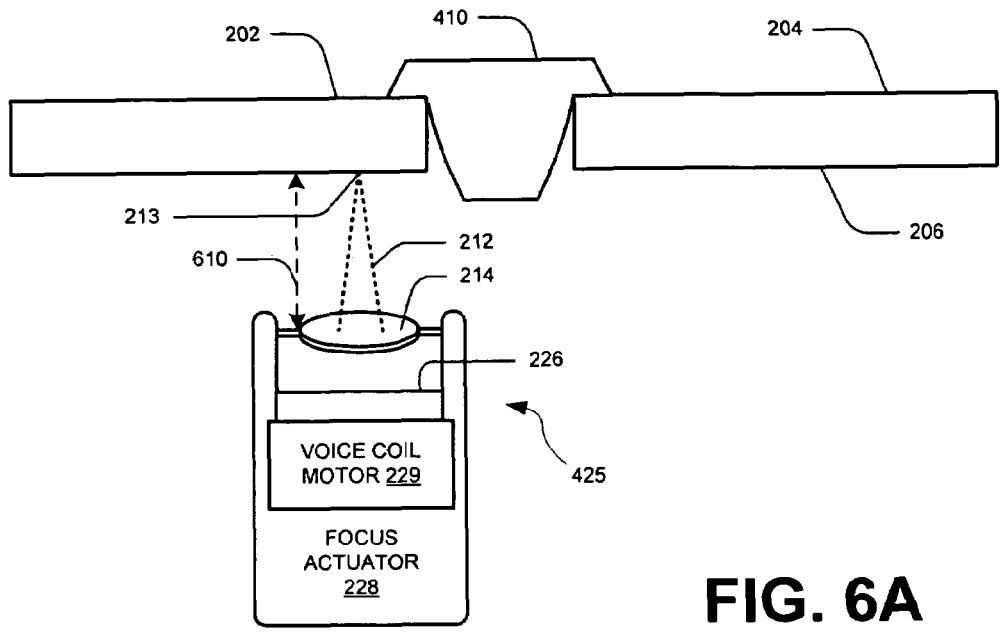
FIG. 6A
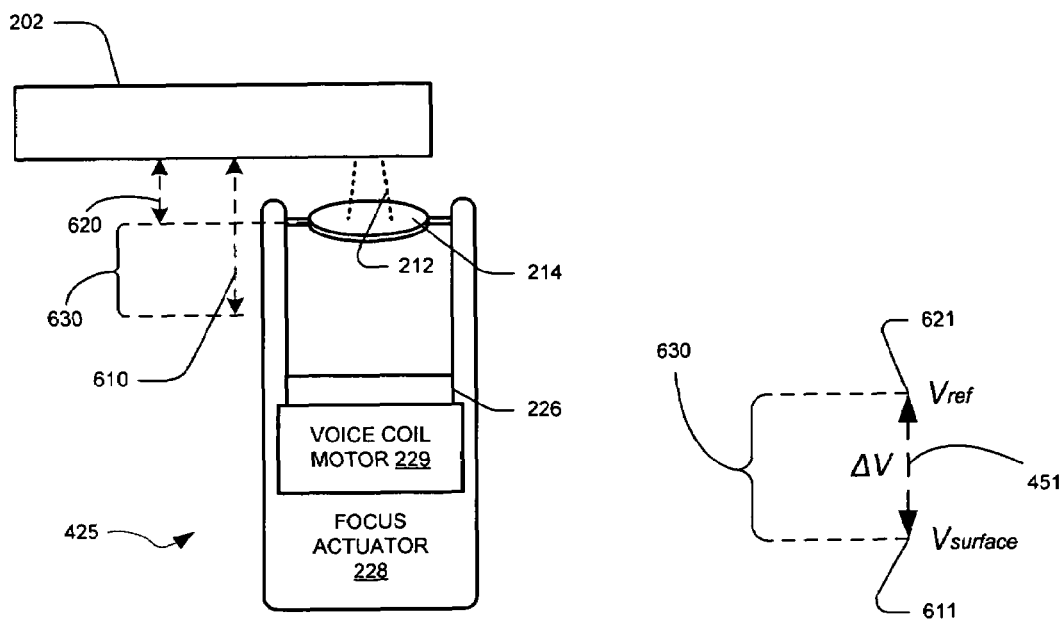
FIG. 6B          FIG. 6C

FOCUS CALIBRATION IN AN OPTICAL DRIVE

BACKGROUND

Low power lasers are used to read and write data on the data side of optical media, such as compact discs (CDs), digital versatile discs (DVDs), and the like. Typically, a laser beam writes various types of data on a data side of a disc while the disc is rotating. Data may be recorded by making marks on the disc, representing binary digits. Various data writing strategies have been employed to create desirably shaped marks that are precisely positioned and that have sharp edges to enable detection.

Labels on such optical discs are typically used to provide descriptive human-readable indicia of the data content recorded on the disc, as well as illustrations, artwork, and the like. Such descriptions and images are generally handwritten, affixed, or marked on the side of the disc opposite the data side. Recently, apparatus and methods have been developed with the ability to generate an image or label on non-data areas, such as the non-data side (the "label side") of an optical disc, using a low power laser, such as the same laser that is employed to read and write digital or electronic data on the data side of the disc. For example, see U.S. Patent Application Publication No. 2003/0108708, Anderson, et al. which is commonly assigned with the present application.

Conventional optical disc drives have a focusing servo incorporating a focus actuator, generally including a voice coil motor. The focus actuator moves an objective lens in a Z-axis direction relative to the disc, to generally maintain the lens at a constant optimal position, sometimes called "best focus" position, relative to the disc. The "best focus" position is typically optimized for reading and writing data on the data side of the disc, such as by selecting a default position where the laser beam is focused on a spot at a layer of recording material below the surface of the data side. The use of a defocused spot for writing disc labels is described by Anderson, et al., in U.S. patent application Ser. No. 10/732,047, filed Dec. 9, 2003, which is commonly assigned with the present application. By defocusing a laser spot rather than using a focused laser spot, a larger marking spot can be achieved on optically labeled disc media without a sacrifice in speed.

In order to accurately position the objective lens at a desired focal position, such as an offset from the "best focus" position, it is desirable to know the amount of movement of the focus actuator given an applied voltage or current. In particular, it is helpful to know or learn the electrical to mechanical gain of the voice coil motor of the focus actuator. This gain may be used to determine the variations in voltage that must be applied to the voice coil motor to allow the positioning of the objective lens at a desired offset from best focus. A value for the gain is generally specified in a data sheet provided by a manufacturer of the voice coil motor, but such figures are typically of limited value, due to variances that may in some cases be plus or minus forty percent (±40%) for a focus actuator voice coil motor installed in an optical drive. Such a wide variation may result in laser-produced markings that undesirably have degraded image quality.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 6A is a depiction of a first focus distance according to a further embodiment of the present invention.

FIG. 6B is a depiction of a second focus distance according to a further embodiment of the present invention.

FIG. 6C is a depiction of a drive signal change according to a further embodiment of the present invention.

DETAILED DESCRIPTION

Figure 1A:
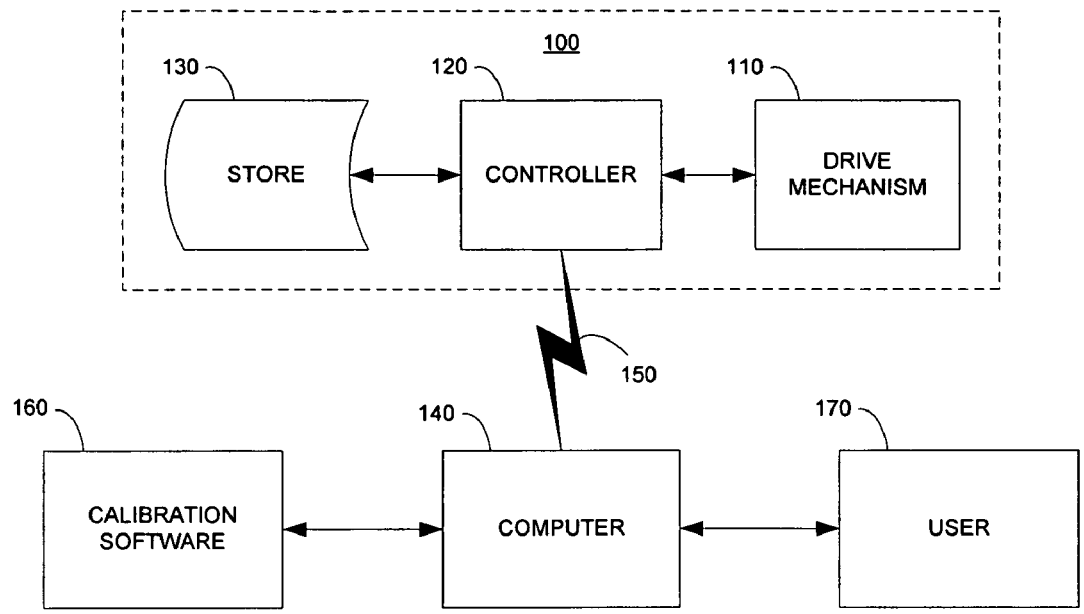
FIG. 1A is a diagram illustrating an optical storage device according to an embodiment of the present invention.

Calibration of the focus voice coil motor enables enhanced precision in focusing the optics of an optical storage device. Focus voice coil motor calibration, using the internal layer thickness of an optical medium such as a CD or DVD, according to embodiments of the present invention, may be especially desirable for use in optical storage devices in the field.

It is desirable to know the amount of movement of the focus actuator given an applied voltage or current. In particular, it is helpful to learn the electrical to mechanical gain of the voice coil motor of the focus actuator. This gain may be used to determine the variations in voltage that must be applied to the voice coil motor to allow the positioning of the objective lens at a desired offset from best focus.

Reference will now be made in detail to an embodiment of the present invention, an example of which is illustrated in the accompanying drawings, wherein like reference numerals illustrate corresponding or similar elements throughout the several views. As will be recognized by one of ordinary skill in the art, the scale and proportions of drawings representing physical components have been greatly exaggerated for illustrative clarity.

FIG. 1A depicts an optical storage device 100 that includes a controller 120 that is able to read information from and write information to a calibration data store 130. The calibration data store 130 may, for example, be a region of non-volatile random access memory (i.e., memory that is protected against loss of power for an extended period of time). The controller 120 controls a drive mechanism 110 for rotating and marking optical media. The drive mechanism 110 is typically able to read and write digital data on the optical media.

The controller 120 is communicatively coupled to a computer 140 by a communications link 150. It is not material whether the storage device 100 is internal or external to the computer 140. The communications link 150 may be any of numerous kinds of links suitable for connecting a peripheral device to a processor of computer 140; for example, a bus (such as PCI), a USB or Firewire link, Fibre Channel, a wired or wireless network connection, and the like. The communications link 150 may be used for transmitting data and instructions between the computer 140 and the device 100, such as data that has been read from the optical media, or that is to be recorded on the optical media.

An exemplary computer 140 is configured with input and output devices, not shown, for communicating with a user 170. In a typical configuration, such devices may include a display, keyboard, and mouse. The exemplary computer 140 is also configured with an operating system able to run applications such as calibration software 160.

Calibration software 160 may be a utility software application able to interact with the user 170 and exchange information with the controller 120. In one implementation, the calibration software 160 may be included in a setup or installation software application associated with the device 100.

In an illustrative example, the controller 120 is able to execute instructions in response to information received from the computer 140. Exemplary instructions may include steps for accessing the calibration data store 130, and for controlling the drive mechanism 110 responsively to information exchanged over communications link 150. Such instructions to the controller 120 may, for example, be located in firmware 232 (FIG. 2), or located in the calibration software 160 and received by the controller 120 from the computer 140.

Figure 1B:
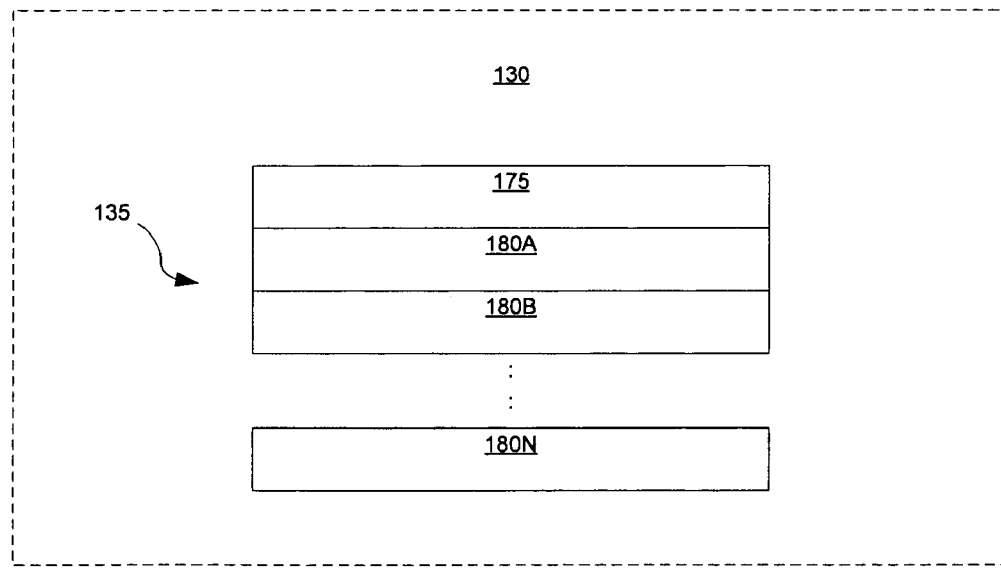
FIG. 1B is a diagram illustrating a calibration data store in accordance with an embodiment of the invention.

FIG. 1B is a diagram of a calibration data store 130 in accordance with an embodiment of the invention. Calibration data 135 may be stored by the controller 120 in calibration data store 130. If valid calibration data 135 has not been stored, the calibration data store 130 may contain a marker, flag, uninitialized calibration data 135, or other information that the controller 120 is configured to recognize as an indication that valid calibration data 135 has not been stored.

The calibration data store 130 may contain calibration data 135 for the focus actuator voice coil motor. Calibration data 135 may include gain data 175, such as a measure of electrical to mechanical gain of the voice coil motor. Calibration data 135 may also include one or more measurement data records 180A, 180B, . . . 180N (collectively measurement data records 180). In an illustrative example, one of the measurement data records 180A may correspond to one disc that has been inserted into the drive mechanism 110, and may contain one or more data values corresponding to measurements taken for the disc. The measurement data record 180A may include one or more items of data, such as measurements of height, distance, voltage, currents, and the like, and/or calculated values derived from such measurements. The measurement data record 180A may also include data items recording differences or deviations between measurements. In another illustrative example, one or more of the measurement data records 180N may include items of data that represent averages, means, minimums, maximums, spreads, or the like, with respect to others of the measurement data records 180.

Because different media types, such as DVD and CD, may differ in the total thickness of the media and the distance of a data recording layer from a surface of the media, it may be desirable to maintain separate sets of measurement data records 180 for a plurality of media types. In other implementations, each one of the measurement data records 180 may contain a flag or field indicating the applicable media type.

In an illustrative example, the calibration data store 130 may be implemented with a fixed number of measurement data records 180, and as new measurement data records 180 are needed, older measurement data records 180 may be overwritten or deleted. Older measurement data records 180 may be selected for overwriting or deletion based on age, or other factors; for example, it may be desirable to remove records 180 containing measurements that are outlier data points inconsistent with the majority of the data records 180 or with other factors.

Figure 2:
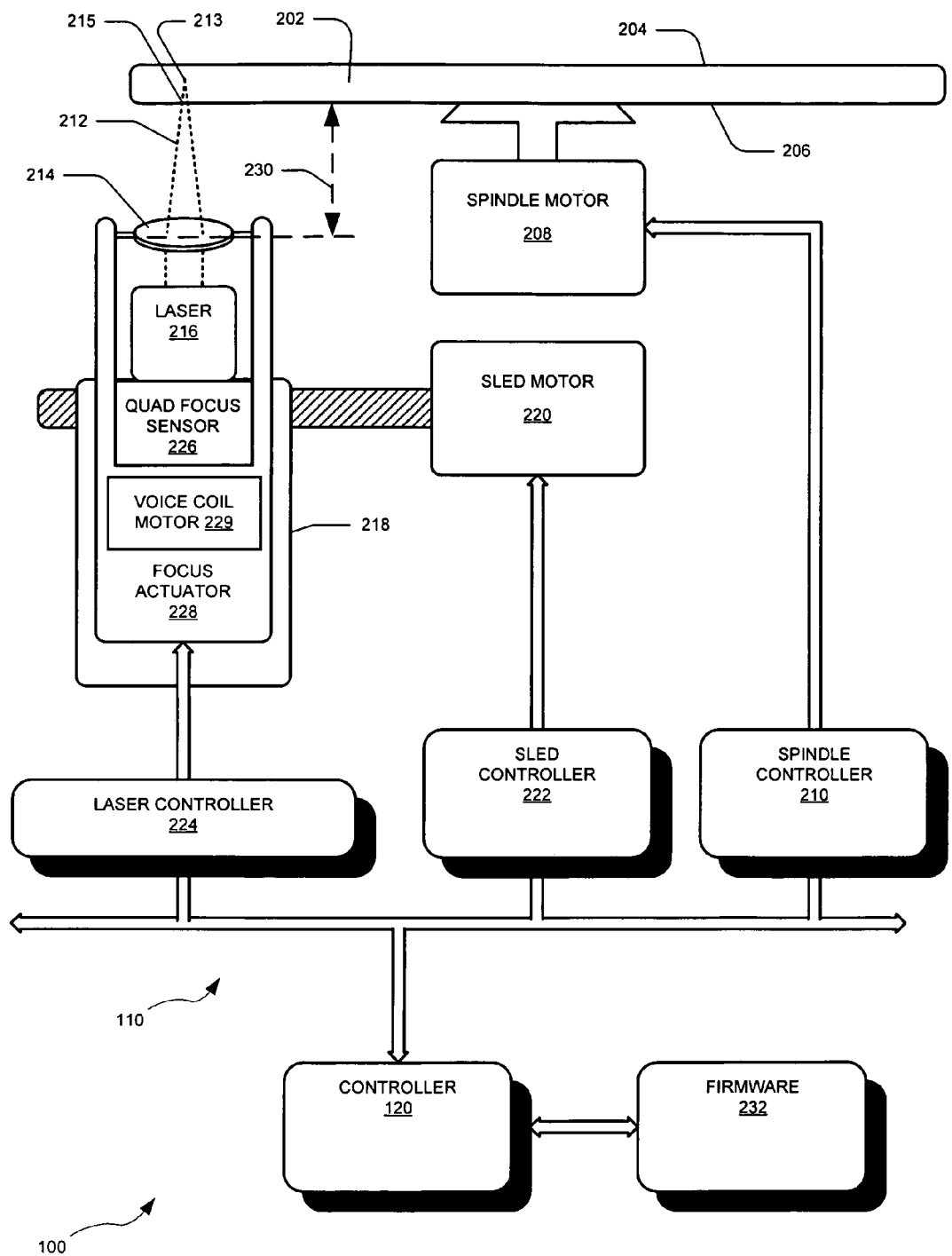
FIG. 2 is a diagram illustrating an exemplary optical storage device according to an embodiment of the present invention.

FIG. 2 is a diagrammatic illustration of an exemplary optical storage device 100. The drive mechanism 110 operates under the direction of the controller 120. The controller 120 is configured to execute program statements such as those contained in firmware 232.

A disc 202 having a data side 204 is shown oriented to position a label side 206 for marking. In other embodiments, the data and the label may be on the same side of the disc 202. The disc 202 is rotated and marked by the drive mechanism 110. More specifically, the disc 202 is rotated by a spindle motor 208, which is controlled by a spindle controller 210. A laser 216 is carried by a sled 218, which is moved in a radial direction by the sled motor 220. In a typical application, a sled controller 222 directs the sled motor 220 to advance the sled 218, carrying the laser 216, in incremental steps from a radially inner edge of a label region of the label side 206 to a radially outer edge of the label region. The laser 216 generates an optical beam such as laser beam 212. The laser beam 212 passes through optics, such as objective lens 214. The objective lens 214 is shown positioned at an exemplary working distance 230 from the disc 202. At the exemplary working distance 230 illustrated in FIG. 2, the objective lens 214 focuses the laser beam 212 upon a point beneath the surface of the label side 206 of the disc 202, such as focal point 213. Accordingly, when the laser beam 212 strikes the coated surface of the label side 206, the laser beam 212 is not in focus, creating an irradiated spot 215 upon the surface of the label side 206 that is generally oval or circular, and desirably larger than the focal point 213.

A laser controller 224 controls the operation of the laser 216 and associated tracking coils and sensors. In the example of FIG. 2, a quad focus sensor 226 typically contains four sensors, and is designed to facilitate focusing generally, such as by providing data for determining the distance between the laser 216 and the disc 202. The quad focus sensor 226 does not directly sense the distance between laser 216 and disc 202, but instead senses the amount of light reflected from the disc 202, which is indicative of the size of the area (such as irradiated spot 215) where the laser beam 212 contacts the surface of the disc 202. In some implementations, the quad focus sensor 226 is adapted for use with optics 214 that focus not only through air, but also through the clear polycarbonate substrate typically used to cover a data recording layer of the disc 202; therefore, the quad focus sensor 226 may be less accurate for writing on the surface of a label side 206 because, in this configuration, the optics 214 are focusing only through air.

The focus actuator 228 is configured to adjust the working distance 230 by moving optics such as the objective lens 214, so that the laser beam 212 may be focused on a focal point 213 at a position that may be at, above, or beneath the surface of the disc 202. The focus actuator 228, for example, includes a voice coil motor 229 that is mechanically coupled to the objective lens 214 (such as by pins connected to the objective lens 214 at a rim of the lens 214), for moving the objective lens 214. The working distance 230 may be adjusted by varying a drive signal, which may be a voltage or current applied to the focus actuator 228, such as a voltage applied to the voice coil motor 229.

Figure 3:
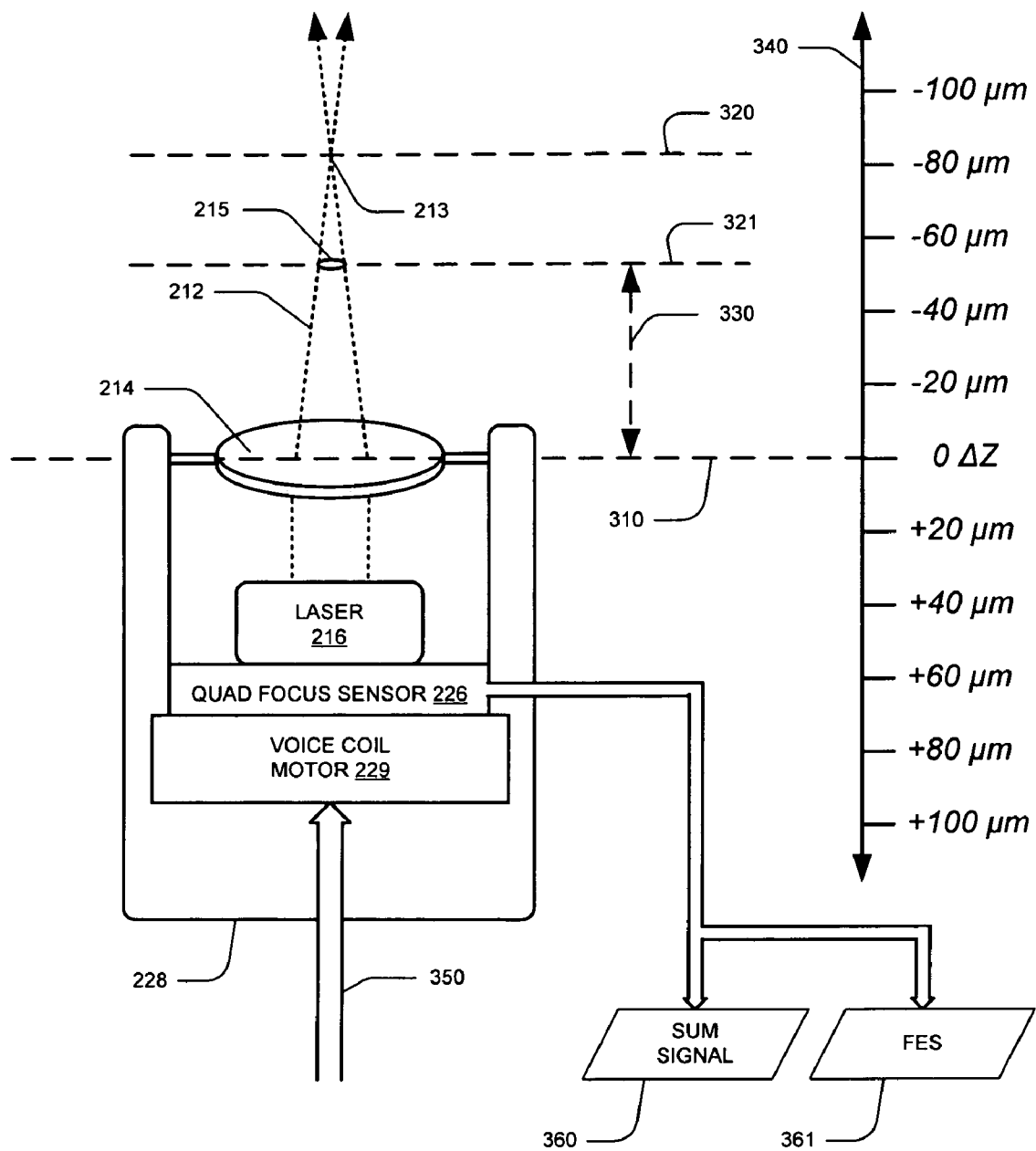
FIG. 3 is a diagram illustrating an exemplary working distance and focus offset according to an embodiment of the present invention.

FIG. 3 illustrates a working distance 330 and focus offset 340 according to an embodiment of the present invention.

An in-focus position 310 is a Z-axis position of the optics (such as the objective lens 214) that causes the laser beam 212 to be focused at a focal point 213 that falls upon the plane of a focal position 320. The focal position 320 may be at, above, or beneath the surface of the disc 202, as desired. When laser beam 212 impinges on the data side 204 of the optical disc 202 in order to write data to the disc 202, the focal position 320 may be at a recording layer of the disc 202 (i.e., a polycarbonate-to-data layer interface), beneath the surface of the disc 202. When laser beam 212 impinges on the label side of the optical disc 202 in order to write markings for a label to the disc 202, the focal position 320 may be at the surface of the label side 206 of the disc 202.

The working distance 330 is the distance from the objective lens 214 to the surface of the label side 206 of the disc 202. The working distance 330 varies as the focus offset 340 is adjusted. In the illustrated example, reference line 321 illustrates the surface plane of the label side 206 of the disc 202.

The focus offset 340 represents a delta-Z (ΔZ) relative to the in-focus position 310. When the focus offset 340 is zero, the objective lens 214 is at the in-focus position 310 (as shown); therefore, the laser beam 212 produces a narrowly focused irradiated spot 215 at the focal point 213. By applying a positive or negative focus offset 340 to the in-focus position 310, the objective lens 214 is moved up or down on the Z-axis, and the working distance 330 becomes correspondingly shorter or longer. The application of positive or negative focus offset 340 results in focusing and defocusing of the irradiated spot 215 on the surface of label side 206 of the disc 202. As depicted, negative values of focus offset 340 typically represent distances closer to the disc 202, and positive values of focus offset 340 typically represent distances further away from the disc 202; however, alternate implementations may use the opposite sign convention if desired. If the objective lens 214 is positioned at the in-focus distance 310, then when writing markings to the label surface 206 of the disc 202, the laser beam 212 would produce undesirably small spots 215. Therefore, the focus offset 340 may be applied to defocus the laser beam 212 at the label surface 206 so as to produce a larger spot size 215 that allows high quality markings to be made in a time-efficient manner.

The focus offset 340 may be changed by adjusting a drive signal, which may be a voltage or current applied to the focus actuator 228, such as the drive voltage 350. In an illustrative embodiment, a drive voltage 350 is applied to the voice coil motor 229 of the focus actuator 228, thereby causing the optics 214 to move to a position on the Z-axis that is related to the drive voltage 350. As the drive voltage 350 is varied, the optics 214 may move up or down on the Z-axis. The drive signal may be adjusted by the controller 120 and/or the laser controller 224. The controller 120 is able to detect the value of the drive signal such as the drive voltage 350.

The quad focus sensor 226 produces a SUM signal 360 and a FES (focus error signal) 361 responsively to light from laser beam 212 that is reflected back to the quad focus sensor 226. The SUM signal 360 and FES 361 may be obtained by the controller 120 (for example, through laser controller 224).

In some embodiments, the in-focus position 310 is the position where a maximum amount of light from laser beam 212 is reflected back to quad focus sensor 226. In other embodiments, the in-focus position 310 may be selected by designers of the device 100; for example, to optimally focus the laser beam 212 on a focal point 213 at a surface of the data side 204 of disc 202 (i.e., an air-to-polycarbonate interface), or at a recording layer of the disc 202 (i.e., a polycarbonate-to-data layer interface), as may be desired. For printing on a label side 206 of the disc 202, a desirable in-focus position 310 may be at a surface of the label side 206 of disc 202 that forms an air-to-label interface.

The in-focus position 310 is a constant distance from the objective lens 214, but the lens 214 must move up and down to match the mechanical movement of the disc 202 up and down (i.e., on a Z-axis) as it rotates through a variety of angular positions with respect to the lens 214. This variation in position may be determined, for example, by a mapping process applied to the disc 202 (for example, upon insertion of disc 202) that yields voltages for driving the focus actuator 228 to maintain the optics 214 at a substantially constant distance from the disc 202 as the disc 202 rotates, compensating for possible warping or other irregularities of the disc 202. For example, one technique for determining in-focus position 310 includes moving the focus actuator 228 up and down by applying a varying voltage 350 to the voice coil motor 229 corresponding to a sinusoidal pattern of focus offsets 340, and using peak voltage information obtained by the SUM signal 360 while the disc 202 rotates, in order to determine the in-focus position 310 at a given rotational angle of the disc 202.

Figure 4A:
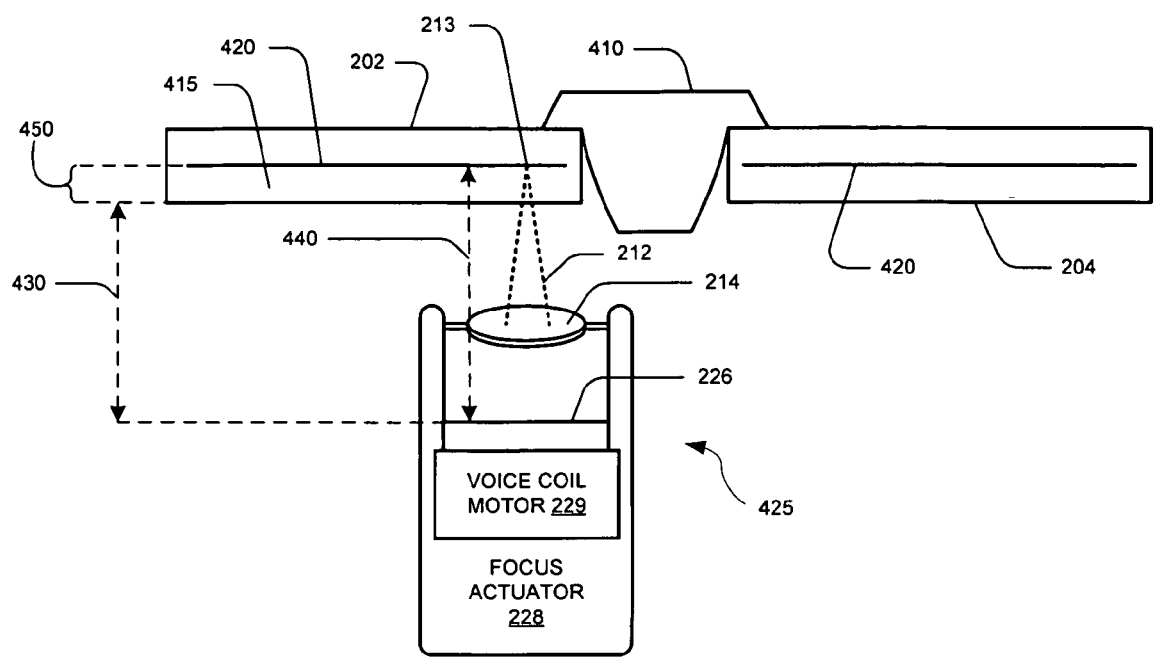
FIG. 4A is a depiction of a disc layer thickness according to an embodiment of the present invention.

FIG. 4A is a depiction of a disc layer thickness according to an embodiment of the present invention. A disc 202 is shown in cross-section, with a clamping device such as platen 410 passing through a central hole in the disc 202 to grip and rotate the disc 202. The disc 202 is shown oriented to position the data side 204 for writing digital data. A surface layer of data side 204 may be composed of a substrate 415, such as a conventional transparent polycarbonate substrate, beneath which a data layer 420 is provided for storing data. First focus distance 430 is the distance on a Z-axis from a selected location on the optical pickup unit 425, such as a point on the quad focus sensor 226, to the surface of the disc 202 (i.e., the air-to-polycarbonate interface).

Second focus distance 440 is the distance on a Z-axis from the selected point on the optical pickup unit 425, such as a point on the quad focus sensor 226, to the data layer 420 of the disc 202 (i.e., the polycarbonate-to-data interface).

A thickness 450 is a measurement of disc layer thickness; that is, the difference between first focus distance 430 and second focus distance 440 represents the thickness 450 of the substrate layer 415 from the surface of data side 204 to the data layer 420. As discussed in further detail below, this thickness 450 may be an "optical thickness," which may be an effective approximation of physical thickness. The optical thickness may be dependent, for example, on a variation in optical path length in the material of the substrate 415. Both refractive index change and actual layer thickness of the substrate 415 can change this optical path length.

A known or predetermined value for the disc layer thickness 450 may be stored in the measurement data 135 for a given media type (such as CD, DVD, and the like). Such a value may readily be obtained or determined by a manufacturer of drive 100. For example, standard references such as the Orange Book contain specifications for disc layer thicknesses. More precise results may be obtained, if desired, by any of numerous methods, such as by averaging measurements taken using actual exemplary discs 202. Table 1 is an illustrative example of data accumulated by measurement with a digital caliper, representing exemplary layer thicknesses of twenty-five DVD discs 202. Two different brands of DVD discs 202 were used for testing. The first twenty rows of Table 1 represent the first brand, and the last five rows of Table 1 represent the second brand.

TABLE 1

| DVD # | Polycarbonate Focus Distance (mm) 430 | Data Focus Distance (mm) 440 | Δz Difference (μm) 450 | Deviation from Average Δz |
|---|---|---|---|---|
| 1 | 22.484 | 22.851 | 367 | −2.3% |
| 2 | 22.492 | 22.869 | 377 | 0.3% |
| 3 | 22.5 | 22.875 | 375 | −0.2% |
| 4 | 22.505 | 22.878 | 373 | −0.7% |
| 5 | 22.491 | 22.859 | 368 | −2.1% |
| 6 | 22.463 | 22.83 | 367 | −2.3% |
| 7 | 22.484 | 22.857 | 373 | −0.7% |
| 8 | 22.483 | 22.858 | 375 | −0.2% |
| 9 | 22.485 | 22.861 | 376 | 0.1% |
| 10 | 22.477 | 22.855 | 378 | 0.6% |
| 11 | 22.481 | 22.851 | 370 | −1.5% |
| 12 | 22.47 | 22.845 | 375 | −0.2% |
| 13 | 22.48 | 22.853 | 373 | −0.7% |
| 14 | 22.488 | 22.854 | 366 | −2.6% |
| 15 | 22.481 | 22.854 | 373 | −0.7% |
| 16 | 22.481 | 22.855 | 374 | −0.5% |
| 17 | 22.481 | 22.853 | 372 | −1.0% |
| 18 | 22.475 | 22.855 | 380 | 1.1% |
| 19 | 22.466 | 22.847 | 381 | 1.4% |
| 20 | 22.473 | 22.847 | 374 | −0.5% |
| 21 | 22.431 | 22.824 | 393 | 4.6% |
| 22 | 22.419 | 22.794 | 375 | −0.2% |
| 23 | 22.441 | 22.814 | 373 | −0.7% |
| 24 | 22.443 | 22.846 | 403 | 7.2% |
| 25 | 22.42 | 22.804 | 384 | 2.2% |

The exemplary testing data shown in Table 1 reveals a minimum value of 366 micrometers (μm) for thickness 450, a maximum value of 403 μm for thickness 450, and an average value of 375.8 μm for thickness 450. Accordingly, the spread for thickness 450 is 9.8%, which is equal to a ±4.9% variation. The variation is likely to be somewhat greater when additional types of media are used and tested.

Measurement of the thickness 450 may be affected by refraction of the laser beam 212 through the substrate 415. Refraction makes the data layer 420 appear to be closer to the optics 214 than it really is; in other words, the physical distance is longer than the optical path that will be sensed. Therefore, the thickness 450 generally represents an "optical thickness" of the substrate 415 above the data layer 420, which includes the effect of refraction brought about by the substrate 415.

In an illustrative example, suppose a thickness 450 of 1.2 millimeters (mm) is determined. The lens 214 does not move a physical distance of 1.2 mm to focus first on the air-to-substrate interface and then on the data layer 420. Rather, because the substrate 415 makes the data layer 420 appear closer than it really is, the distance moved in this example may be on the order of 720 μm. In an embodiment of the invention, the exemplary value of thickness 450 will be 720 μm (the distance the focus actuator is moved) rather than 1.2 mm (the actual material thickness).

In some embodiments, it may be desired to derive the distance moved by the lens 214. For example, if the index of refraction in the material of substrate 415 and design parameters of the optical pickup unit 425 (such as a numeric aperture) are known, the physical distance may be derived from the actual thickness of the substrate 415 and the index of refraction of substrate 415. As will be appreciated by those skilled in optics, a simple derivation accounting only for marginal rays, and discounting paraxial rays, may provide a sufficient approximation of the distance the focus actuator 228 must move the optics for the given thickness of material and index of refraction for substrate 415. Conversion factors for distance focusing through polycarbonate vs. focusing through air will vary depending on the index of refraction in the material of substrate 415, and optical system design elements such as the numeric aperture of the optical system. Design differences between optical systems, e.g., from manufacturer to manufacturer, may be accounted for by a drive factor for the drive mechanism 110, which may be obtained by modeling or measurement of test discs 202.

Figure 4B:
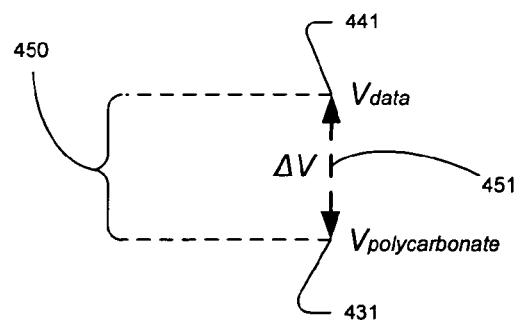
FIG. 4B is a depiction of a drive signal change according to an embodiment of the present invention.

FIG. 4B is a depiction of a drive signal change 451 according to an embodiment of the present invention. A first drive signal value 431 may, for example, be the value of drive voltage 350 that causes the optics 214 to focus on the surface of the disc 202 (i.e., the air-to-polycarbonate interface). A second drive signal value 441 may, for example, be the value of drive voltage 350 that causes the optics 214 to focus on the data layer 420 of the disc 202 (i.e., the polycarbonate-to-data layer interface). The drive signal change 451 is the change in the value of the drive signal from the first value 431 to the second value 441. As the drive signal is varied by the amount of the drive signal change 451, the optics 214 will move up or down on the Z-axis by a distance approximately equal to the optical thickness 450.

Figure 5:
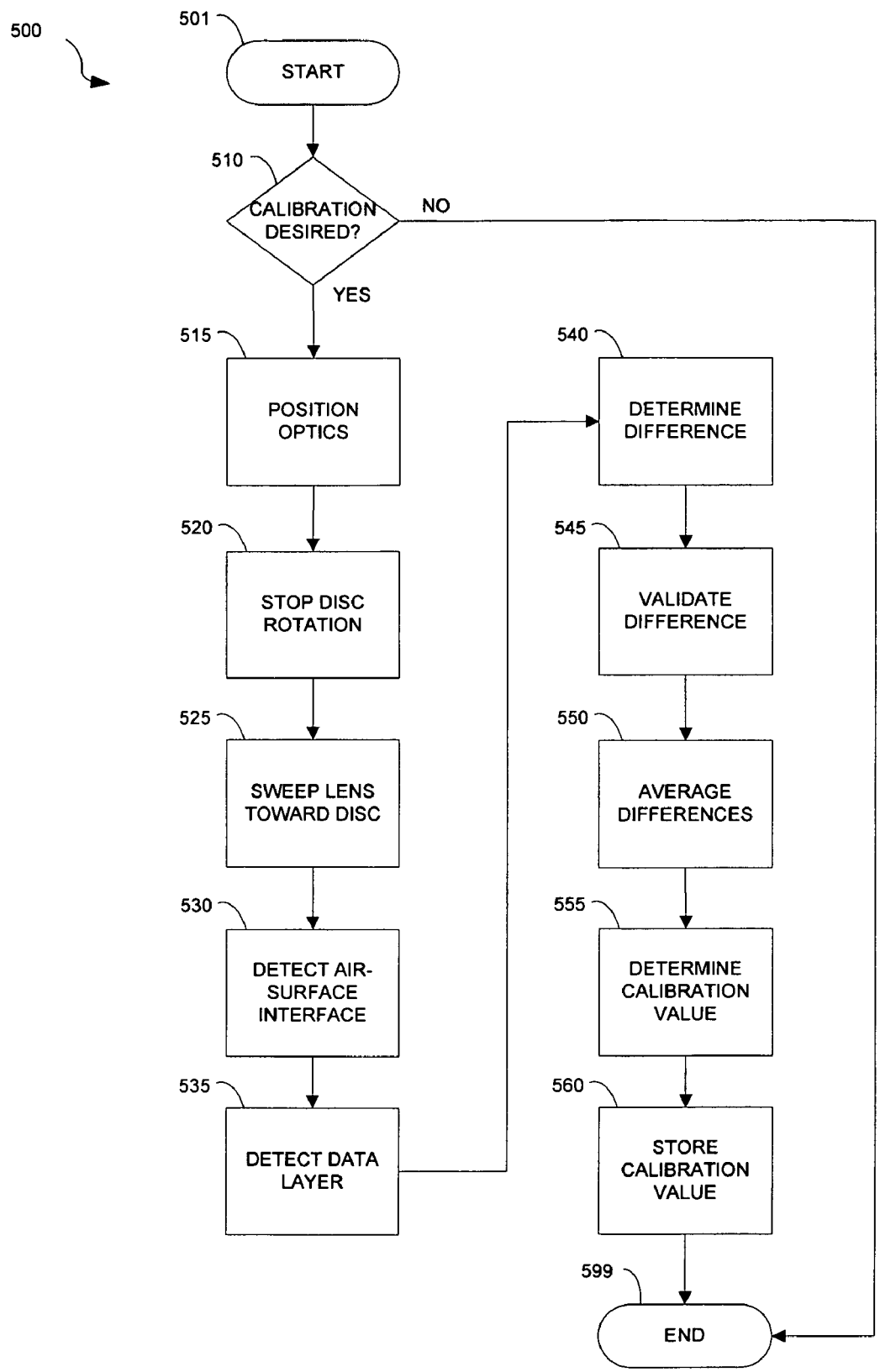
FIG. 5 is a flow chart of a method for focus voice coil motor calibration according to an embodiment of the present invention.

FIG. 5 shows a method 500 for focus voice coil motor calibration according to an embodiment of the present invention. The method 500 begins at start block 501, and proceeds to block 510. At block 510, a check may be performed to determine whether or not calibration is desired. For example, in some implementations, calibration may be desired each time a newly inserted disc 202 is detected in the drive mechanism 110. Calibration may not be desired if the disc 202 is oriented to position the label side 206 for marking. Accordingly, the check at block 510 includes detecting a data side 204 of the disc 202.

In some implementations, calibration may be desired if the calibration data store 130 does not contain valid calibration data 135, or does not contain measurement data records 180 that are sufficiently numerous or recent. The determination of whether to perform a calibration may generally be made by the controller 120. In other implementations, the determination may be made by the computer 140 according to instructions in the calibration software 160, which may, for example, be configured to initiate calibration upon request from the user 170, or to receive confirmation from the user 170 before initiating calibration.

If the check at block 510 indicates that calibration is not desired, the controller 120 may use existing calibration data 135 in the calibration data store 130, or the storage device 100 may default to settings that are designed to work adequately without calibration, and the method 500 concludes at block 599. If the check at block 510 indicates that calibration is desired, the method 500 proceeds to block 515. At block 515 the optics, such as objective lens 214, are positioned. The objective lens 214 may be moved toward the center of disc 202, such as to a minimum radial distance from the center of disc 202, to reduce the importance of any tilt of the disc 202. In some embodiments, it is preferred for the objective lens 214 to be positioned over an area of the disc 202 that is not designed to contain data, such as a mirror area near the center of the disc 202.

At block 520, the disc 202 is kept stationary or caused to be stationary (i.e., not rotating), in order to reduce any effects of disc flutter. If the disc 202 is rotating, the rotation of the disc 202 may be stopped, or the method 500 may wait until the rotation of the disc 202 has stopped.

At block 525, the objective lens 214 is moved to a position far from the surface of the disc 202, such as the farthest permissible position. From there, the lens 214 is moved in a Z-axis direction, sweeping towards the surface of the disc 202. The lens 214 is moved by applying a drive signal, such as drive voltage 350, to the voice coil motor 229 of the focus actuator 228. In an alternate embodiment, the motion of the objective lens 214 may be in an opposite direction.

At block 530, a peak in the SUM signal 360 may be used to detect that the lens 214 has reached a first focal position where the laser spot 213 is focused on the surface of the data side 204 of the disc 202. The reflection of the laser beam 212 at the air-to-substrate interface allows for detection of this first focal position during the motion of the lens 214. In an illustrative example of an air-to-substrate interface, an air-to-polycarbonate interface may be about four percent reflective.

Once the peak in the SUM signal 360 is detected, a first value 431 associated with the drive signal (such as the drive voltage 350) that is required to get the lens 214 to the first focal position may be recorded, such as in one of the measurement data records 180 of the calibration data store 130. In some implementations, the FES signal 370 may also be used to locate the first focal position more precisely after the peak in the SUM signal 360 is detected. In a further implementation, the first focal position may be located using a repeating voice coil motor 229 waveform stimulus and detection of peaks of the SUM signal 360. In some embodiments, the first focus distance 430 (an illustrative example of which is shown in FIG. 4A) also may be recorded in the measurement data record 180.

At block 535, the objective lens 214 continues sweeping towards the surface of the disc 202. In an alternate embodiment, the motion of the objective lens 214 may be in an opposite direction. A peak in the SUM signal 360 may be used to detect that the lens 214 has reached a second focal position where the laser spot 213 is focused on the data layer 420 of the disc 202. The reflection of the laser beam 212 at the substrate-to-data interface allows for detection of this second focal position during the motion of the lens 214. In an illustrative example, a polycarbonate-to-data interface may be about thirty to sixty percent reflective.

Once the peak in the SUM signal 360 is detected, a second value 441 associated with the drive signal (such as the drive voltage 350) that is required to get the lens 214 to the second focal position may be recorded, such as in one of the measurement data records 180 of the calibration data store 130. In some implementations, the FES signal 370 may also be used to locate the second focal position more precisely after the peak in the SUM signal 360 is detected. In a further implementation, the second focal position may be located using a repeating voice coil motor 229 waveform stimulus and detection of peaks of the SUM signal 360. In some embodiments, the second focus distance 440 (an illustrative example of which is shown in FIG. 4A) also may be recorded in the measurement data record 180.

At block 540, a difference (such as drive signal change 451) is determined between the first drive signal value 431 and the second drive signal value 441; for example, the difference between the two values of drive voltage 350 at blocks 530 and 535, respectively. The drive signal change 451 may be recorded, such as in one of the measurement data records 180 of the calibration data store 130. The drive signal change 451 corresponds to the voltage change (or current change) required for moving the lens 214 a distance that is approximately equal to the thickness 450.

The thickness 450 may be a known or predetermined value. The thickness 450 may be recorded in the calibration data store 130, such as in one of the measurement data records 180.

At block 545, the difference (such as drive signal change 451) is validated, and an erroneous measurement or outlier data point may be discarded. For example, the difference may be discarded if it does not fall within known maximum and minimum bounds, based upon specifications and industry standards for disc layer thicknesses. In some implementations, the difference may be discarded if drive signal change 451 is an outlier; for example, if the drive signal change 451 is deemed insufficiently close to the average of drive signal changes 451 previously recorded in the calibration data store 130.

At block 550, an average of the differences (such as values of drive signal change 451) in the calibration data store 130 is determined; i.e., an average drive signal change 451 required to move the lens 214 a distance approximating the disc layer thickness of the substrate layer 415 from the surface of data side 204 to the data layer 420. The average is calculated separately for each media type, such as CDs and DVDs. This average thickness may be dependent, for example, on variations in optical path length in the material of the substrate 415. Both refractive index change and actual layer thickness of the substrate 415 can change this optical path length.

At block 555, a calibration value may be determined for each media type, such as by using the following equation:

$$G_{vcm} = \text{Thickness}/(V_{polycarbonate} - V_{data})$$

In the equation, $G_{vcm}$ is an approximation of the electrical to mechanical gain of the voice coil motor 229. Thickness 450 means the disc layer thickness, as discussed above with respect to FIG. 4A, for the media type being calibrated. The thickness 450 is generally an optical thickness, discussed above with respect to block 540.

The difference between $V_{polycarbonate}$ and $V_{data}$ is drive signal change 451. $V_{polycarbonate}$ is the first drive signal value 431, such as the drive voltage 350 at the first focal position, i.e., where the laser spot 213 is focused on the surface of the data side 204 of the disc 202. $V_{data}$ is the second drive signal value 441, such as the drive voltage 350 at the second focal position, i.e., where the laser spot 213 is focused on the data layer 420 of the disc 202. In one embodiment, the values of $V_{polycarbonate}$ and $V_{data}$ may be taken from the most recent measurements at blocks 530 and 535, respectively. In other embodiments, $V_{polycarbonate}$ and $V_{data}$ may, for example, be averages of drive voltage 350 measurements stored in calibration data store 130. While the $G_{vcm}$ of the illustrative example is calculated using values of a drive voltage 350, it will be readily understood by one skilled in the art that a difference in current may also be used to determine $G_{vcm}$, and that a drive signal value expressed as a current may be converted to a voltage, where the resistance of the voice coil motor 229 is known. Accordingly, the invention is not limited to the exemplary equation used above for calculating $G_{vcm}$.

The $G_{vcm}$ for each media type (such as CD and DVD) may then be averaged to determine a calibration value, such as gain data 175, for the focus voice coil motor 229.

At block 560, the calibration value, such as gain data 175, is stored in the calibration data store 130. The device 100 may use the gain data 175 for all subsequent operations of the voice coil motor 229. The method 500 then concludes at block 599.

FIG. 6A illustrates a first focus distance according to a further embodiment of the present invention, suitable for use with a label side 206 of a disc 202. The disc 202 is shown oriented to position the label side 206 for marking. An exemplary label side 206 may include a coating through which the laser beam 212 cannot focus on the data layer 420. In this embodiment, first focus distance 610 is the distance on a Z-axis from a selected location on the optical pickup unit 425, such as a point on the objective lens 214, to the surface of the label side 206 of disc 202 (i.e., the air-to-label interface).

A reference value of the first focus distance 610 may be a known or predetermined value, which may, for example, be measured by a manufacturer of the drive 100, and which may vary, for example, based on the design of the optical pickup unit 425.

FIG. 6B is a depiction of a second focus distance 620 according to an further embodiment of the present invention. The focus actuator 228 is illustrated at a reference position where the drive signal (such as drive voltage 350) has a known value that may be used as a baseline. For example, in some embodiments, the reference position is a rest position; i.e., the focus actuator 228 is settled at a position where the drive voltage 350 to the voice coil motor 229 is zero, and the current in the coil is zero. The second focus distance 620 is the distance on a Z-axis from the selected point on the optical pickup unit 425, such as a point on the objective lens 214, to the surface of the label side 206 of disc 202 (i.e., the air-to-label interface) when the focus actuator 228 is at the reference position. The second focus distance 620 is a known or predetermined value, which may, for example, be provided by the manufacturer of the storage device 100.

Accordingly, a difference 630 between first focus distance 610 and second focus distance 620 represents the distance from the selected point at the reference position of the focus actuator 228 to the surface of label side 206.

A reference value of the difference 630 is a known or predetermined value, which may, for example, be measured by a manufacturer of the drive 100. The reference value may be different for each media type (such as CD, DVD, and the like).

FIG. 6C is a depiction of a drive signal change 451 according to an embodiment of the present invention. A first drive signal value 611 may, for example, be the value of drive voltage 350 that causes the optics 214 to focus on the surface of the disc 202 (i.e., the air-to-polycarbonate interface). A second drive signal value 621 may, for example, be the value of drive voltage 350 at the reference position of the focus actuator 228. The drive signal change 451 is the change in the value of the drive signal from the first value 611 to the second value 621. As the drive signal is varied by the amount of the drive signal change 451, the optics 214 will move up or down on the Z-axis by a distance equal to the difference 630, and approximately equal to the known reference value of the difference 630.

Figure 7:
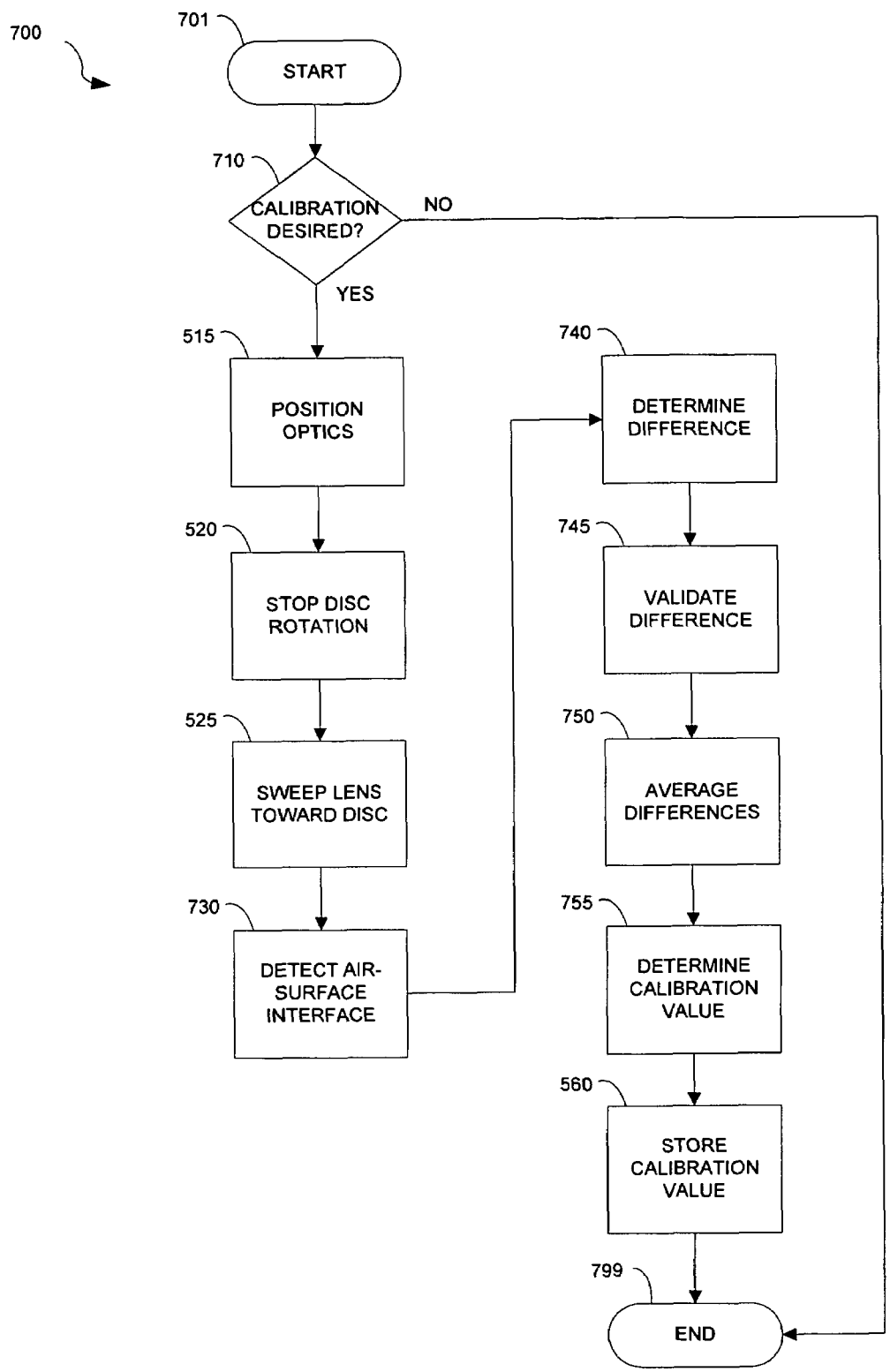
FIG. 7 is a flow chart of a method for focus voice coil motor calibration according to a further embodiment of the present invention.

FIG. 7 shows a method 700 for focus calibration according to a further embodiment of the present invention. The method 700 begins at start block 701, and proceeds to block 710.

The check at block 710 is substantially the same as the check at block 510 above, except that calibration may be performed regardless of whether disc 202 is oriented to position the data side 204 for marking or the label side 206 for marking.

If the check at block 710 indicates that calibration is not desired, the controller 120 may use existing calibration data 135 in the calibration data store 130, or the storage device 100 may default to settings that are designed to work adequately without calibration, and the method 700 concludes at block 799. If the check at block 710 indicates that calibration is desired, the method 700 proceeds to block 515.

Blocks 515, 520, and 525 are described above with reference to FIG. 5. From block 525, the method proceeds to block 730.

At block 730, a peak in the SUM signal 360 may be used to detect that the lens 214 has reached a first focal position where the laser spot 213 is focused on the surface of the label side 206 of the disc 202. The reflection of the laser beam 212 at the air-to-surface interface allows for detection of this first focal position during the motion of the lens 214.

Once the peak in the SUM signal 360 is detected, a first value 611 associated with the drive signal (such as the drive voltage 350) that is required to get the lens 214 to the first focal position may be recorded, such as in one of the measurement data records 180 of the calibration data store 130. In some implementations, the FES signal 370 may also be used to locate the first focal position more precisely after the peak in the SUM signal 360 is detected. In a further implementation, the first focal position may be located using a repeating voice coil motor 229 waveform stimulus and detection of peaks of the SUM signal 360. The first focus distance 610 (an illustrative example of which is shown in FIG. 6A) may be recorded in the measurement data record 180.

At block 740, the difference 630 (such as drive signal change 451) may be determined. As discussed above with reference to FIG. 6B, the second focus distance 620 is a known value, which may be provided by the manufacturer of the storage device 100. The difference 630 may be taken between the first focus distance 610 and the second focus distance 620. The difference 630 may then be recorded in the calibration data store 130, such as in one of the measurement data records 180.

At block 745, the difference 630 (such as drive signal change 451) is validated against the known reference value of difference 630, and an erroneous measurement or outlier may be discarded. For example, the difference 630 may also be discarded if the drive signal change 451 does not fall within known maximum and minimum bounds, based upon specifications and industry standards. In some implementations, the difference 630 may be discarded if it is an outlier; for example, if the drive signal change 451 is deemed insufficiently close to the average of the values of drive signal change 451 previously recorded in the calibration data store 130.

At block 750, an average of the differences 630 (such as values of drive signal change 451) in the calibration data store 130 is determined; i.e., an average drive signal change 451 required to move the lens 214 a distance approximating the distance on the Z-axis from the surface of label side 206 to the reference position of the focus actuator 228.

At block 755, a calibration value may be determined for each media type, such as by using the following equation:

$$G_{vcm} = \text{Distance}/V_{surface}$$

In the equation, $G_{vcm}$ is an approximation of the electrical to mechanical gain of the voice coil motor 229. Distance means the known reference value of difference 630 for the media type being calibrated. $V_{surface}$ is the first value 611 of the drive voltage 350 at the first focal position, i.e., where the laser spot 213 is focused on the surface of the label side 206 of the disc 202. The drive voltage 350 at the reference position is known; for example, at the rest position, the drive voltage 350 may be known to be zero.

In another embodiment, in which the drive voltage at the reference position is non-zero, an alternative equation may be used, in which $V_{ref}$ is the second value 621 of the drive voltage 350 at the reference position:

$$G_{vcm} = \text{Distance}/(V_{surface} - V_{ref})$$

In one embodiment, the values of Distance, $V_{ref}$ and $V_{surface}$ may be taken from the most recent measurement at block 730. In other embodiments, $V_{ref}$ and/or $V_{surface}$ may, for example, be an average of drive voltage 350 measurements stored in calibration data store 130. While the $G_{vcm}$ of the illustrative example is calculated using values of a drive voltage 350, it will be readily understood by one skilled in the art that a difference in current may also be used to determine $G_{vcm}$, and that a drive signal value expressed as a current may be converted to a voltage, where the resistance of the voice coil motor 229 is known. Accordingly, the invention is not limited to the exemplary equation used above for calculating $G_{vcm}$.

The $G_{vcm}$ for each media type (such as CD and DVD) may then be averaged to determine a calibration value, such as gain data 175, for the focus voice coil motor 229.

From block 755, the method proceeds to block 560. Block 560 is described above with reference to FIG. 5. From block 560, the method 700 then concludes at block 799.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for focus calibration in an optical drive, comprising:
   moving optics with respect to a disc in the optical drive,
   optically detecting a first interface of the disc at a first distance,
   detecting a first drive signal value at the first interface,
   determining a drive signal change using a second drive signal value at a second distance,
   determining a gain using the drive signal change and a thickness associated with the first and second distances, and
   using the gain to determine a third drive signal value to position the optics at a third distance.

2. The method of claim 1 wherein the first and second drive signal values are expressed as voltages.

3. The method of claim 2 wherein determining a gain comprises dividing the value of the thickness by the value of the drive signal change.

4. The method of claim 1 wherein the first and second drive signal values are expressed as currents.

5. The method of claim 4 wherein determining a gain comprises dividing the value of the drive signal change by the value of the thickness.

6. The method of claim 1 wherein the thickness is approximated by a difference between the first and second distances.

7. The method of claim 1 wherein the first interface is an air-to-substrate interface.

8. The method of claim 1 further comprising recording the drive signal change in a calibration data store.

9. The method of claim 8 further comprising determining an average drive signal change using the drive signal change and one or more previously recorded drive signal changes in the calibration data store.

10. The method of claim 9 wherein determining a gain comprises dividing the value of the thickness by the average value of the drive signal change.

11. The method of claim 9 wherein determining a gain comprises dividing the average value of the drive signal change by the value of the thickness.

12. The method of claim 1 further comprising recording the gain in a calibration data store.

13. The method of claim 12 wherein the calibration data store comprises a plurality of gains corresponding to a plurality of media types.

14. The method of claim 13 further comprising:
   averaging the plurality of gains to determine a calibration value, and
   recording the calibration value in the calibration data store.

15. The method of claim 1 wherein moving optics comprises delivering a drive signal to a voice coil motor able to move the optics responsively to the drive signal.

16. The method of claim 1 wherein the gain approximates an electrical-to-mechanical gain of a focus voice coil motor.

17. The method of claim 1 wherein moving optics comprises moving the optics in an axial direction with respect to the disc.

18. The method of claim 1, comprising:
   orienting the optics adjacent a label side of the disc, wherein the third drive signal value positions the optics at a desired distance from the label side.

19. A method for focus calibration in an optical drive, comprising:
   moving optics with respect to a disc in the optical drive,
   optically detecting a first interface of the disc at a first distance,
   detecting a first drive signal value at the first interface,
   optically detecting a second interface of the disc at a second distance,
   detecting a second drive signal value at the second interface,
   determining a drive signal change between the first drive signal value and the second drive signal value, and
   determining a gain using the drive signal change and a thickness associated with the first and second distances.

20. The method of claim 19 wherein the second interface is a substrate-to-data layer interface.

21. The method of claim 19 further comprising:
   using the gain to determine a third drive signal value to position the optics at a third distance.

22. A method for focus calibration in an optical drive, comprising:
   moving optics with respect to a disc in the optical drive,
   optically detecting a first interface of the disc at a first distance,
   detecting a first drive signal value at the first interface,
   providing a second distance between a reference position of a focus actuator and a surface of the disc, and a known drive signal value at the reference position, without detecting a second interface at the second distance,
   determining a drive signal change between the first drive signal value and the known drive signal value, and
   determining a gain using the drive signal change and a difference between the first and second distances.

23. The method of claim 22 wherein the reference position is a rest position of the focus actuator, and the known drive signal value is zero.

24. The method of claim 23 further comprising validating the difference against one or more known values.

25. The method of claim 22, further comprising:
   using the gain to determine a third drive signal value to position the optics at a third distance.

26. An optical storage device comprising:
   a mechanism able to focus an optical beam onto a surface of a medium within the optical storage device,
   a focus actuator mechanically coupled to the mechanism, and
   a controller communicatively coupled to the focus actuator and to a data store for containing a gain value associated with a voice coil motor, the controller being adapted to cause a first drive signal value to be applied to the focus actuator to move the mechanism with respect to the medium, to detect a first interface of the medium at a first distance, to determine a drive signal change using a second drive signal value at a second distance, and to determine the gain value using the drive signal change and a thickness associated with a difference between the first and second distances, and to use the gain to determine a third drive signal value to position the mechanism at a third distance.

27. The optical storage device of claim 26 wherein the focus actuator comprises a voice coil motor.

28. The optical storage device of claim 26 wherein the first interface is an air-to-substrate interface.

29. The optical storage device of claim 26 wherein the controller is further adapted to determine the gain value by dividing the value of the thickness by the value of the drive signal change.

30. The optical storage device of claim 26 wherein the gain value approximates an electrical-to-mechanical gain of the voice coil motor.

31. The optical storage device of claim 26, wherein the controller is further adapted to orient the mechanism adjacent a label surface of the medium, wherein the third drive signal value positions the optics at a desired distance from the label surface when applied to the focus actuator.

32. An optical storage device comprising:

a mechanism able to focus an optical beam onto a surface of a medium within the optical storage device, a focus actuator mechanically coupled to the mechanism, and a controller communicatively coupled to the focus actuator and to a data store for containing a gain value associated with a voice coil motor, the controller being adapted to cause a first drive signal value to be applied to the focus actuator to move the mechanism with respect to the medium, to detect a first interface of the medium at a first distance, to cause a second drive signal value to be applied to the focus actuator to move the mechanism further with respect to the medium, to detect a second interface of the medium at the second distance, to determine a drive signal change between the first drive signal value and the second drive signal value, and to determine the gain value using the drive signal change and a thickness associated with a difference between the first and second distances.

33. The optical storage device of claim 32 wherein the second interface is a substrate-to-data layer interface.

34. The optical storage device of claim 32 wherein the controller is further adapted to use the gain to determine a third drive signal value to position the mechanism at a third distance.

35. An optical storage device comprising:

a mechanism able to focus an optical beam onto a surface of a medium within the optical storage device, a focus actuator mechanically coupled to the mechanism, and a controller communicatively coupled to the focus actuator and to a data store for containing a gain value associated with a voice coil motor, the controller being adapted to cause a first drive signal value to be applied to the focus actuator to move the mechanism with respect to the medium, to detect a first interface of the medium at a first distance, to provide a second distance between a reference position of the focus actuator and the surface of the medium, and a known drive signal value at the reference position, without detecting a second interface at the second distance, to determine a drive signal change between the first drive signal value and the known drive signal value, and to determine the gain value using the drive signal change and a difference between the first and second distances.

36. The optical storage device of claim 35 wherein the reference position is a rest position of the focus actuator, and the known drive signal value is zero.

37. The optical storage device of claim 35 wherein the controller is further adapted to use the gain to determine a third drive signal value to position the mechanism at a third distance.

38. A computer-readable medium containing a set of instructions for calibration of an optical drive, the set of instructions comprising steps for:

moving optics with respect to a second medium in the optical drive, optically detecting a first interface of the second medium at a first distance, detecting a first drive signal value at the first interface, determining a drive signal change using a second drive signal value at a second distance, determining a difference between the first and second distances, determining a gain using the difference and the drive signal change, and using the gain to determine a third drive signal value to position the optics at a third distance.

39. The computer-readable medium of claim 38 wherein the first interface is an air-to-substrate interface.

40. The computer-readable medium of claim 38 wherein determining a gain comprises dividing the value of the difference by the value of the drive signal change.

41. The computer-readable medium of claim 38, the set of instructions further comprising steps for validating the difference against one or more known values.

42. The computer-readable medium of claim 38, the set of instructions further comprising steps for recording the difference and the drive signal change in a calibration data store.

43. The computer-readable medium of claim 42, the set of instructions further comprising steps for determining an average difference using the difference and one or more previously recorded differences in the calibration data store, and determining an average drive signal change using the drive signal change and one or more previously recorded drive signal changes in the calibration data store.

44. The computer-readable medium of claim 38, the set of instructions further comprising steps for recording the gain in a calibration data store.

45. The computer-readable medium of claim 44 wherein the calibration data store comprises a plurality of gains corresponding to a plurality of media types, the set of instructions further comprising steps for:

averaging the plurality of gains to determine a calibration value, and recording the calibration value in the calibration data store.

46. The computer-readable medium of claim 38, the set of instructions further comprising steps for:

orienting the optics adjacent a label side of the second medium, wherein the third drive signal value positions the optics at a desired distance from the label side.

47. A computer-readable medium containing a set of instructions for calibration of an optical drive, the set of instructions comprising steps for:
- moving optics with respect to a second medium in the optical drive,
- optically detecting a first interface of the second medium at a first distance,
- detecting a first drive signal value at the first interface,
- optically detecting a second interface of the second medium at a second distance,
- detecting a second drive signal value at the second interface,
- determining a drive signal change between the first drive signal value and the second drive signal value,
- determining a difference between the first and second distances, and
- determining a gain using the difference and the drive signal change.

48. The computer-readable medium of claim 47 wherein the second interface is a substrate-to-data layer interface.

49. The computer-readable medium of claim 47, the set of instructions further comprising steps for using the gain to determine a third drive signal value to position the optics at a third distance.

50. A computer-readable medium containing a set of instructions for calibration of an optical drive, the set of instructions comprising steps for:
- moving optics with respect to a second medium in the optical drive,
- optically detecting a first interface of the second medium at a first distance,
- detecting a first drive signal value at the first interface,
- providing a second distance between a reference position of a focus actuator and a surface of the disc, and a known drive signal value at the reference position, without detecting a second interface at the second distance,
- determining a drive signal change between the first drive signal value and the known drive signal value,
- determining a difference between the first and second distances, and
- determining a gain using the difference and the drive signal change.

51. The computer-readable medium of claim 50 wherein the reference position is a rest position of the focus actuator, and the known drive signal value is zero.

52. The computer-readable medium of claim 50, the set of instructions further comprising steps for using the gain to determine a third drive signal value to position the optics at a third distance.

53. A focus calibration system comprising:
- means for moving optics with respect to a disc in the optical drive,
- means for optically detecting a first interface of the disc at a first distance, and a second interface of the disc at a second distance,
- means for detecting a first drive signal applied to the means for moving at the first distance, and a second drive signal applied to the means for moving at the second distance,
- means for determining a drive signal change between the first and second drive signals, a difference between the first and second distances, and a gain using the difference and the drive signal change,
- means for storing the gain, and
- means for using the gain to determine a third drive signal to position the optics at a third distance.

54. A method for operating a laser, comprising:
- orienting the laser adjacent a data side of an optical disc, the laser including a mechanism operable via a drive signal to position the laser at a plurality of distances from the data side;
- applying a first drive signal to detect a first feature of the optical disc;
- applying a second drive signal to detect a second feature of the optical disc spaced at a known distance from the first feature; and
- determining a gain for the mechanism based on the known distance and the first and second drive signals;
- reorienting the laser adjacent a label side of an optical disc; and
- using the gain to apply a third drive signal to the mechanism so as to position the laser at a desired distance from the label side.

55. The method of claim 54, comprising:
- operating the laser at the desired distance to write a marking of a desired size on the label side.

56. The method of claim 54, wherein the first feature is an air-to-substrate interface and wherein the second feature is a substrate-to-data layer interface.

* * * * *